United States Patent [19]

Patel

[11] Patent Number: 6,118,993
[45] Date of Patent: Sep. 12, 2000

[54] EFFECTIVE USE OF DIALED DIGITS IN CALL ORIGINATION

[75] Inventor: Sarvar Patel, Montville, N.J.

[73] Assignee: Lucent Technologies, Inc., Murray Hill, N.J.

[21] Appl. No.: 09/002,852

[22] Filed: Jan. 5, 1998

[51] Int. Cl.⁷ .................................... H04M 1/66
[52] U.S. Cl. .................... 455/411; 455/410; 340/825.34; 380/247
[58] Field of Search .................... 455/403, 410, 455/411, 418, 419, 422, 435, 550, 551, 561, 575, 517; 380/247, 248, 271; 340/825.31, 825.34

[56] References Cited

U.S. PATENT DOCUMENTS

| 5,239,294 | 8/1993 | Flanders et al. ......................... 380/248 |
| 5,282,250 | 1/1994 | Dent et al. .............................. 455/411 |
| 5,457,737 | 10/1995 | Wen ........................................ 379/62 |
| 5,572,193 | 11/1996 | Flanders et al. .................... 340/825.34 |
| 5,828,956 | 10/1998 | Shirai .................................... 455/411 |
| 5,835,858 | 11/1998 | Vaihoja et al. ......................... 455/411 |
| 5,884,158 | 3/1999 | Ryan, Jr. et al. ........................ 455/411 |
| 5,943,614 | 8/1999 | Obayashi et al. ....................... 455/411 |
| 5,943,615 | 8/1999 | Rose et al. .............................. 380/247 |
| 5,956,636 | 9/1999 | Lipsit ..................................... 455/411 |

FOREIGN PATENT DOCUMENTS

| 708071 | 4/1997 | Australia . |
| 0506637A2 | 9/1992 | European Pat. Off. ......... H04Q 7/04 |
| WO92/02103 | 2/1992 | WIPO ............................. H04Q 7/00 |
| WO9711548 | 3/1997 | WIPO . |
| WO9715161 | 4/1997 | WIPO . |

*Primary Examiner*—Dwayne D. Bost
*Assistant Examiner*—Nay Maung

[57] ABSTRACT

The present invention strengthens authentication protocols by making it more difficult for handset impersonators to perform call origination using replay attacks. The present invention accomplishes this goal by using the most significant digits of a telephone number being dialed as a parameter for determining authentication codes. Using the most significant digits makes it more difficult for impersonators to successfully use replay attacks on call origination, wherein the replay attacks involve the appendage of digits to a telephone number to be dialed.

12 Claims, 6 Drawing Sheets

EFFECTIVE USE OF DIALED DIGITS IN CALL ORIGINATION

FIELD OF THE INVENTION

The present invention relates generally to wireless communication systems and, in particular, to authentication protocols.

BACKGROUND OF THE INVENTION

The wireless communication industry loses hundreds of millions of dollars a year to fraud. Much of the fraud comes from handset or mobile-telephone impersonators (e.g., unauthorized subscribers or users of wireless communications networks) using user identity information associated with legitimate handsets or mobile-telephones (e.g., authorized subscribers or users of wireless communications networks), such as mobile identification numbers (MIN) and/or electronic serial numbers (ESN), to gain system access to wireless communications networks. Many different techniques have been developed to reduce wireless communication fraud. Such techniques include using authentication protocols to verify whether a requesting handset or mobile-telephone (i.e., handset seeking to gain system access) is a legitimate handset or mobile-telephone.

Authentication protocols generally involve a handset transmitting an authentication code to a wireless communications network. The authentication code is a secret key associated with the handset and is used by the network to authenticate or verify whether the handset is a legitimate handset. The authentication code is either known to the handset and network, or may be determined independently by the handset and the network. If the handset's authentication code (i.e., authentication code transmitted by the handset) does not match the network's authentication code for the handset (i.e., authentication code known or determined by the network to be associated with the handset), the handset is not authenticated and will be denied system access to the wireless communications network. If the handset's authentication code matches the network's authentication code for the handset, the handset is authenticated and will be allowed system access to perform system access functions, such as registration, page response and call origination.

The background of the present invention will be described herein with reference to the well-known IS-41 standard, which is the North American standard for intersystem signaling for wireless communications networks. This should not, however, be construed to limit the present invention in any manner. The IS-41 standard defines authentication protocols which use a cryptographic function known as the Cellular Authentication and Voice Encryption (CAVE) algorithm to determine an authentication code. FIG. 1 is an illustration 10 showing a plurality of parameters x being used as inputs for the CAVE algorithm. At least one of the parameters x is a private key uniquely associated with the handset and is known only to the handset and the network. The parameters x are provided as inputs to the CAVE algorithm to obtain an authentication code. One notable feature of the CAVE algorithm is that no known method exists for reversing or breaking the CAVE algorithm.

In one implementation of the IS-41 standard, the CAVE algorithm is executed using a microprocessor or an Application Specific Integrated Circuit (ASIC), and the parameters x are stored in a plurality of registers (hereinafter referred to as CAVE registers) from which they are loaded into the microprocessor or ASIC. The CAVE registers include a 32 bit linear feedback shift register (LFSR), sixteen 1 byte registers (i.e., R00 through R15), and two 1 byte offset registers (i.e., offset 1 and offset 2).

The authentication protocols defined by the IS-41 standard include protocols for global challenges and unique challenges, as will be described herein. Global challenges require every handset attempting to gain system access to respond with an authentication code referred to herein as an authentication-random code (AUTHR). FIG. 2 illustrates the authentication protocol for a global challenge. A network 20 issues a global challenge by generating and broadcasting a global random number (RAND) to be used by every handset (attempting to gain system access) to respond with an AUTHR. The global challenge is received by a handset 22, which uses the RAND and other information as parameters for generating the AUTHR. Note that the handset 22 should respond with its AUTHR before expiration of a predetermined or random time interval, wherein the network 20 issues a new global challenge upon expiration of such time interval.

FIG. 3 illustrates the parameters for generating the AUTHR in response to a global challenge. The parameters are loaded from the CAVE registers 30 into a microprocessor 32 executing the CAVE algorithm. Specifically, the following AUTHR parameters are loaded from the CAVE registers 30 into the microprocessor 32: a secret shared data A (SSD-A) from registers R00–R07; an authentication algorithm version (AAV) from register R08; a MIN1 from registers R09–R11 if the handset wants to perform registration or page response; the last six digits of a telephone number to be dialed from registers R09–R11 if the handset wants to perform call origination; an electronic serial number (ESN) from registers R12–R15; the RAND from the LFSR; and a value of one hundred twenty eight (128) from offsets 1 and 2. The SSD-A is a private key known only to the network 20 and the handset 22; the AAV specifies the version of the CAVE algorithm being used to generate the authentication code; the MIN1 is the NXX-XXXX portion of a mobile identification number (MIN); and the ESN identifies the make and model of the handset 22. The RAND is typically XOR (i.e., exclusive OR) with the thirty-two most significant bits of the SSD-A, and then XOR with the thirty-two least significant bits of the SSD-A.

The handset 22 responds to the global challenge by transmitting to the network its output from the microprocessor 32 (i.e., AUTHR) along with its MIN and ESN. If the handset 22 wants to perform the call origination function, the handset 22 will also include the telephone number to be dialed in its response. The network 20 uses the MIN and/or ESN in the handset's response to determine the SSD-A and the AAV for the handset 22. For example, the network 20 uses one or more look-up tables that correlate MINs and/or ESNs to SSD-As and AAVs in order to determine a SSD-A and an AAV for a given MIN and/or ESN. Upon determining the SSD-A and AAV for the received MIN and/or ESN, the network 20 uses the appropriate version of the CAVE algorithm (as indicated by the AAV) to independently determine its AUTHR for authenticating the AUTHR received from the handset 20. Specifically, the network 20 uses as input parameters for the CAVE algorithm the SSD-A and AAV values determined by the network 20, the RAND generated by the network 20, the NXX-XXXX portion of the received MIN (i.e., MIN1), the received ESN and the value of one hundred twenty eight (128) for the offsets 1 and 2. Note that the last six digits of the received telephone number is substituted for the MIN1 if the handset wants to perform call origination. The network's AUTHR is compared to the handset's AUTHR (transmitted by the handset 22) to authenticate the handset 22.

If the handset's response to the global challenge fails or if the network 20 does not use global challenges to authenticate handsets, the network 20 may issue a unique challenge to authenticate handsets. Unlike a global challenge, a unique challenge is directed to a particular handset attempting to gain system access. FIG. 4 illustrates the authentication protocol for a unique challenge. The handset 22 transmits an access signal to the network 20. The access signal includes the handset's MN and ESN and an indication that the handset 22 wants to gain system access to perform a system access function, such as call origination, page response or registration. The network 20 issues a unique challenge to the handset 22 to respond with an authentication code referred to herein as an authentication-unique random code (AUTHR). The unique challenge includes the handset's MIN (to indicate the particular handset to which the unique challenge is directed) and a random-unique number (RANDU) generated by the network 20, which is to be used by the handset to respond with the AUTHU.

The handset 22 receives the unique challenge and uses the RANDU and other information as parameters for generating the AUTHU. FIG. 5 illustrates the parameters for generating the AUTHU in response to a unique challenge. The parameters are loaded from the CAVE registers 30 to the microprocessor 32 executing the CAVE algorithm. Specifically, the following parameters are loaded: the secret shared data A (SSD-A) from registers R00–R07; the authentication algorithm version (AAV) from register R08; the MIN1 from registers R09–R11; the electronic serial number (ESN) from registers R12–R15; the RANDU and MIN2 from the LFSR, wherein the MIN2 is the NPA portion (i.e., area code) of the mobile identification number; and a value of one hundred twenty eight (128) from offsets 1 and 2. Note that the AUTHU parameters differ from the AUTHR parameters in that the former parameters include the RANDU and MIN2 instead of the RAND, and the MIN1 for call origination instead of the last six digits of the telephone number to be dialed. The handset 22 responds by transmitting to the network 20 its AUTHU along with its MIN, ESN and/or telephone number to be dialed. The network 20 uses the MIN and ESN (received via the handset's response) to generate its own AUTHU for comparison with the handset's AUTHU (for purposes of authenticating the handset 22).

Both of the above-described authentication protocols have weaknesses which make it possible for an impersonator or cloner to steal services from a network by impersonating a legitimate handset. These weaknesses are typically subject to replay attacks wherein the impersonator intercepts an authentication code transmitted by a legitimate handset and replays (or re-transmits) the intercepted authentication code to the network. Thus, the impersonator pretends to be the legitimate handset in order to gain system access to the network.

FIG. 6 illustrates how an impersonator or cloner might respond to a global challenge using a replay attack. The impersonator comprises a network impersonator 36 (for portraying itself as a legitimate network to a legitimate handset) and a handset impersonator 38 (for portraying itself as a legitimate handset to a legitimate network). The network impersonator 36 obtains a victim handset 22's (i.e., legitimate handset) MIN and ESN by listening to communication channels over which the victim handset 22 typically transmits its MIN and ESN—that is, the network impersonator 36 intercepts the victim handset's MIN and ESN. About the same time or some time thereafter, the handset impersonator 38 listens for the RAND broadcaster by the network 20 via a global challenge. The handset impersonator 38 relays the RAND to the network impersonator 36, which page queries the victim handset 22 (i.e., solicits the victim handset 22 to respond with a page response) and issues a false global challenge with the RAND received by the handset impersonator 38 (and issued by the legitimate network 20).

The victim handset 22 receives the network impersonator's page query and global challenge (with the RAND) and determines an AUTHR using the RAND and its SSD-A, AAV, MIN1 and ESN (and the value of 128 for the offsets). Upon determining its AUTHR, the victim handset responds to the network impersonator's page query and global challenge with its MIN, ESN and AUTHR. The network impersonator 36 listens to the victim handset's response and relays it to the handset impersonator 38, which replays or sends it to the network 20 as the handset impersonator's response to the global challenge.

The above described replay attack on global challenges is effective for handset impersonators attempting to gain system access to perform page response or registration because the victim handset determined the AUTHR using the MIN1. Gaining system access to perform page response and registration allows the handset impersonator 38 to register as the victim handset 22 and receive telephone calls dialed to the victim handset's telephone number. However, the replay attack of FIG. 6 does not allow the handset impersonator 38 to gain system access to perform call origination because the last six digits of the telephone number to be dialed were not used by the victim handset as a parameter for determining the AUTHR (as required for call origination). Since the impersonator cannot make the victim handset 22 determine a AUTHR using a specific telephone number (i.e., telephone number handset impersonator wants to dial), the above described replay attack cannot be used by the impersonator to perform call origination.

The impersonator may, however, modify the replay attack of FIG. 6 to successfully respond to challenges on call origination using the MIN1 as the six least significant digits of the telephone number to be dialed, as will be described herein. As mentioned earlier, the MIN1 is a seven digit value being stored in registers R09–R11, which comprises twenty-four bits (i.e., eight bits per byte). Without encoding, four bits are used to represent a single digit. Thus, twenty-eight bits (i.e., four bits multiplied by seven digits) would be needed to represent the seven digit MIN1 without encoding. Since the registers R09–R11 comprises only twenty-four bits, the seven digit MIN1 needs to be encoded such that it may be represented using twenty-four bits (thus, allowing the seven digit MIN1 to fit within the registers R09–R11). If the twenty-four bits representing the seven digit MIN1 (hereinafter referred to as the "encoded MIN1") can be mapped to a six digit number, then a modification of the replay attack of FIG. 6 may be used to respond successfully to challenges on call origination.

For example, the network impersonator 36 listens for MIN's transmitted by possible victim handsets. When the network impersonator 36 finds a victim handset 22 with a MIN1 that, when encoded, can be mapped to a six digit number (such victim handset is also referred to herein as a mapped handset), the impersonator is ready to attack the authentication protocol. The handset impersonator 38 will then listen for the RAND transmitted by the network 20. The RAND is relayed to the network impersonator 36, which page queries and issues a challenge (with the RAND) to the mapped handset 22. The mapped handset 22 responds with its AUTHR, which was determined using its MIN1. The network impersonator 36 receives and relays the mapped handset's 22 AUTHR to the handset impersonator 38, which transmits the AUTHR, ESN and MIN of the victim handset, and a bogus telephone number. The bogus telephone number comprising a first part and a second part. The first part being the most significant digits of the bogus telephone number and including a telephone number the impersonator wants to dial. The second part being the least significant digits of the bogus telephone number and including the six digits mapped to the encoded MIN1 of the victim handset.

When the network 20 receives the handset impersonator's response, the network 20 will use the six least significant digits of the bogus telephone number, i.e., the second part, to determine its AUTHR. The network's AUTHR will match the AUTHR in the impersonator's response (i.e., victim handset's AUTHR determined using its MIN1), and the entire bogus telephone number will be provided to one or more communications networks (e.g., local exchange carriers and long distance carriers) to complete the telephone call. The communications networks will use as many of the bogus telephone number's most significant digits as necessary to complete or route the telephone call. The first part of the bogus telephone number will provide the communications networks with sufficient information to complete or route the call. The second part of the bogus telephone number will be ignored by the communications networks because all the necessary information for completing the call has already been provided by the first part. Thus, the second part does not affect the routing of the telephone number indicated by the first part, but assists the handset impersonator in gaining system access for performing call origination.

FIG. 7 illustrates how an impersonator or cloner might respond to a unique challenge using a replay attack. A replay attack upon a unique challenge first begins with the network impersonator 36 obtaining the MIN and ESN of the victim handset 22. The MIN and ESN are relayed to the handset impersonator 38, which uses the MIN and ESN to request system access to the network 20. The network 20 issues a unique challenge by generating and transmitting to the handset impersonator 38 a RANDU along with the MIN of the victim handset 22 (being used by the handset impersonator 38 to request system access). The handset impersonator 38 relays the RANDU number to the network impersonator 36 which, in turn, sends a unique challenge (using the RANDU and the victim handset's MIN) to the victim handset 22. The victim handset 22 responds with an AUTHU determined using the RANDU. The network impersonator 36 relays the AUTHU to the handset impersonator 38 which, in turn, replays the AUTHU in response to the unique challenge posed to the handset impersonator 38 by the network 20. The AUTHU transmitted by the handset impersonator 38 will match the network's AUTHU for the victim handset 22, thus the handset impersonator 38 gains system access to the network 20. Unlike global challenges, the telephone number being dialed by the victim handset (or handset impersonator) is never a function of the AUTHU. Thus, the handset impersonator can effectively respond to a unique challenge and gain system access to perform system access functions, including call origination.

Accordingly, there exists a need for strengthening authentication protocols against replay attacks by handset impersonators performing call origination.

SUMMARY OF THE INVENTION

The present invention strengthens authentication protocols by making it more difficult for handset impersonators to perform call origination using replay attacks. The present invention accomplishes this goal by using the most significant digits of a telephone number being dialed as a parameter for determining authentication codes. Using the most significant digits makes it more difficult for impersonators to successfully use replay attacks on call origination, wherein the replay attacks involve the appendage of digits to a telephone number to be dialed.

In one embodiment of the present invention, the fifteen or eighteen most significant digits of the telephone number being dialed is used as a parameter for determining an authentication code. An impersonator attempting to perform call origination using the authentication code determined by the legitimate handset would not be able to place a telephone call to any other telephone number than the one dialed by the legitimate handset. If the impersonator attempts to dial a different telephone number, the network will determine its authentication code using the different telephone number. Such authentication code determined by the network will be different from the authentication code determined by the legitimate handset (and used in a replay attack by the impersonator). Thus, the impersonator will not be authenticated by the network and denied system access.

BRIEF DESCRIPTION OF THE DRAWINGS

The features, aspects, and advantages of the present invention will become better understood with regard to the following description, appended claims, and accompanying drawings where:

DETAILED DESCRIPTION

For illustration purposes, the present invention is described herein with respect to the authentication protocols defined by the well-known IS-41 standard. This should not be construed, however, to limit the present invention in any manner. It would be apparent to one of ordinary skill in the art to apply the principles of the present invention to other authentication protocols.

Figure 1:
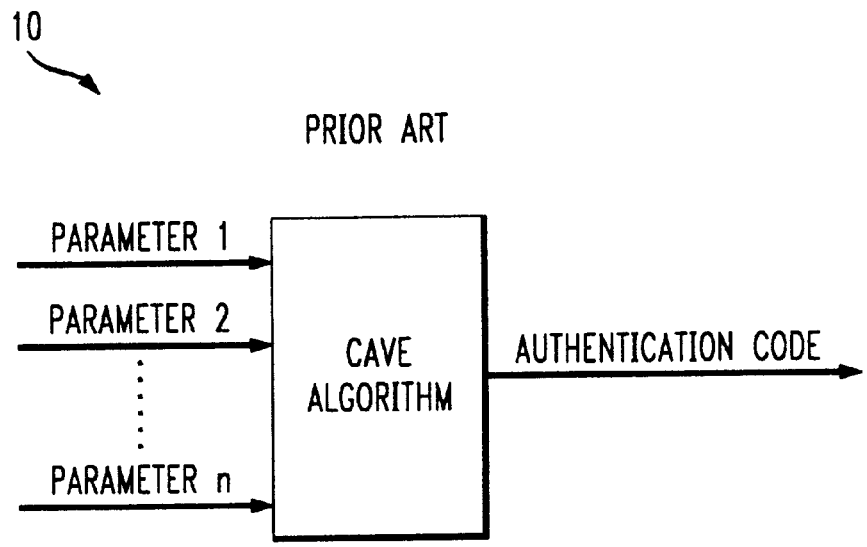
FIG. 1 depicts a plurality of parameters x being used as inputs for a CAVE algorithm.
Figure 2:
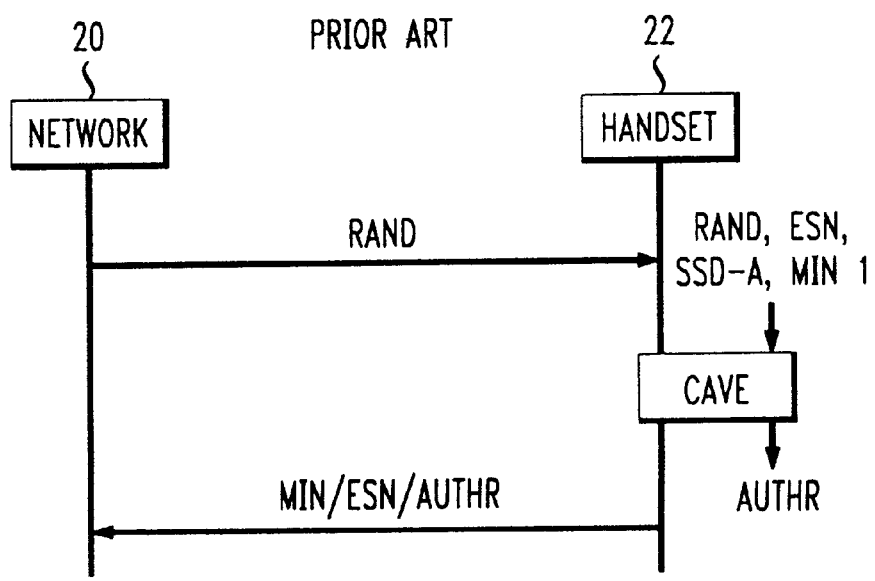
FIG. 2 illustrates the authentication protocol for a global challenge.
Figure 3:
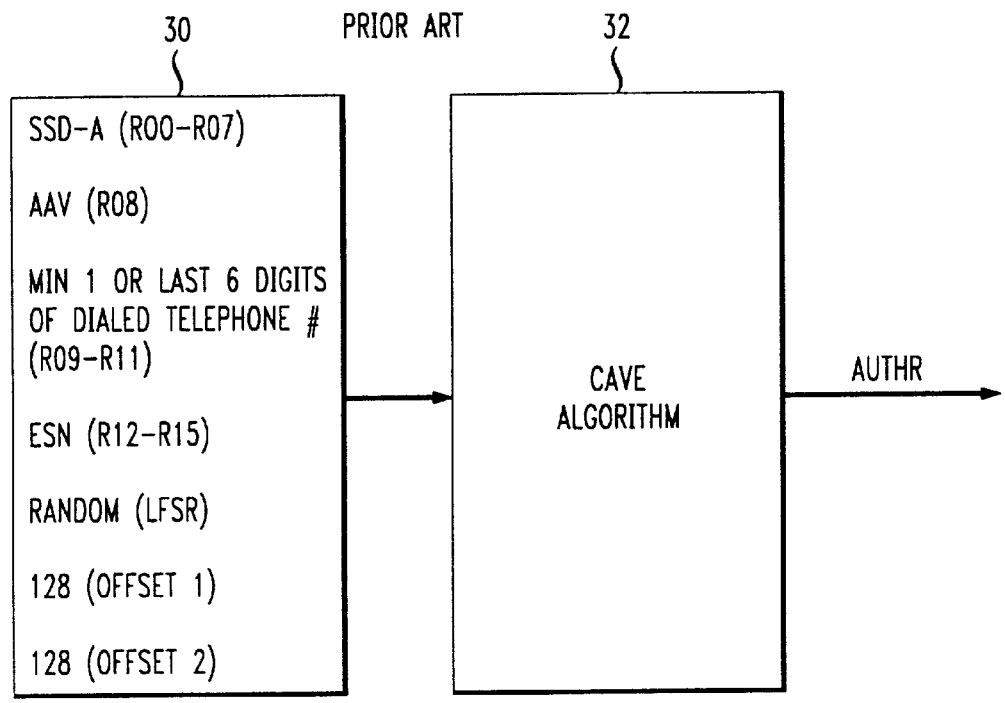
FIG. 3 illustrates the parameters for generating an AUTH in response to a global challenge.
Figure 4:
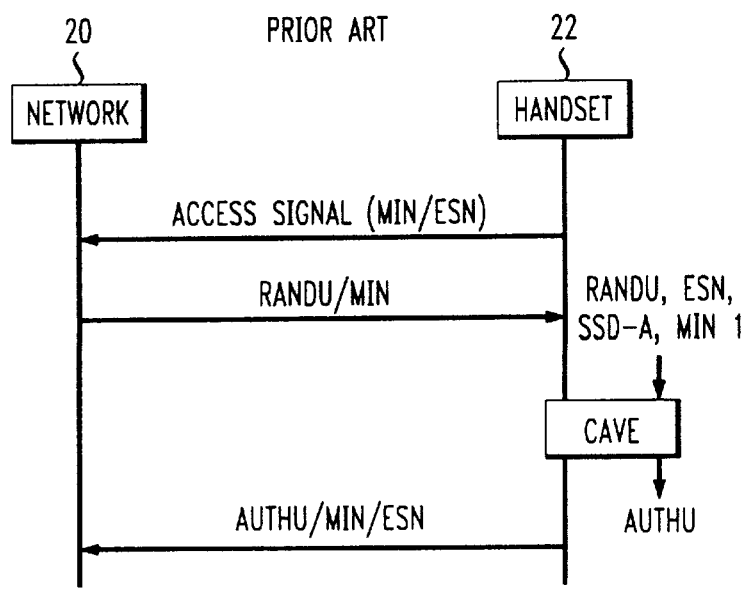
FIG. 4 illustrates the authentication protocol for a unique challenge.
Figure 5:
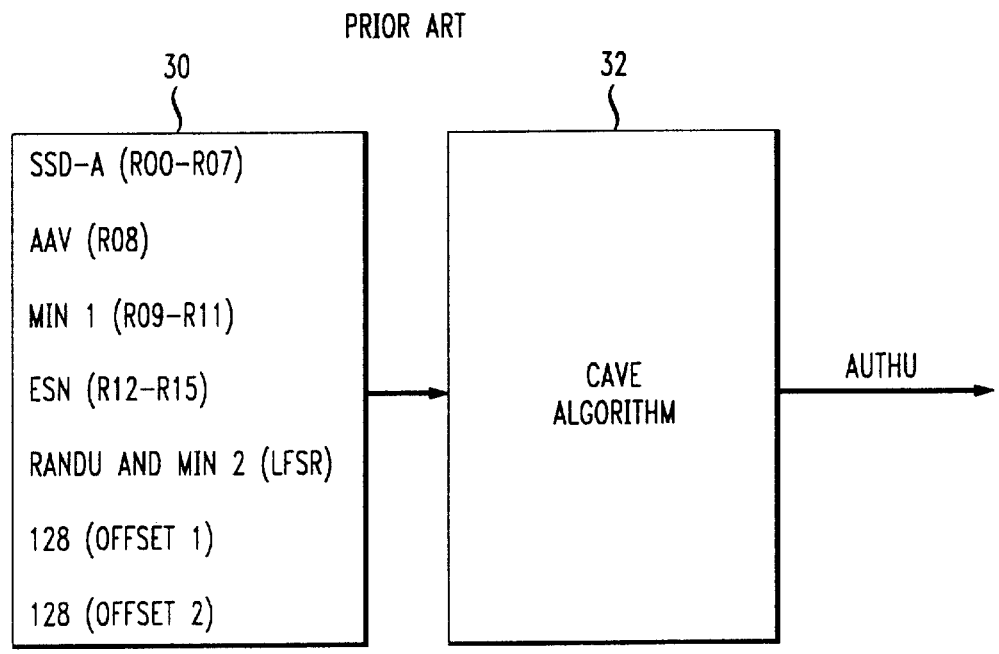
FIG. 5 illustrates the parameters for generating the AUTHU in response to a unique challenge.
Figure 6:
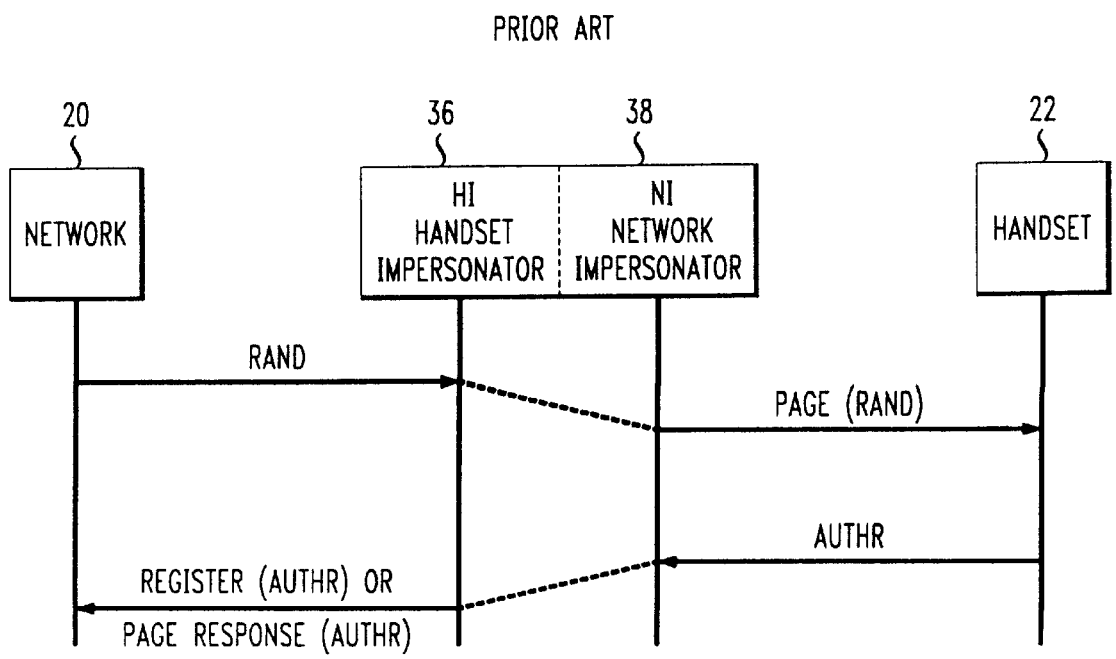
FIG. 6 illustrates how an impersonator or cloner might respond to a global challenge using a replay attack.
Figure 7:
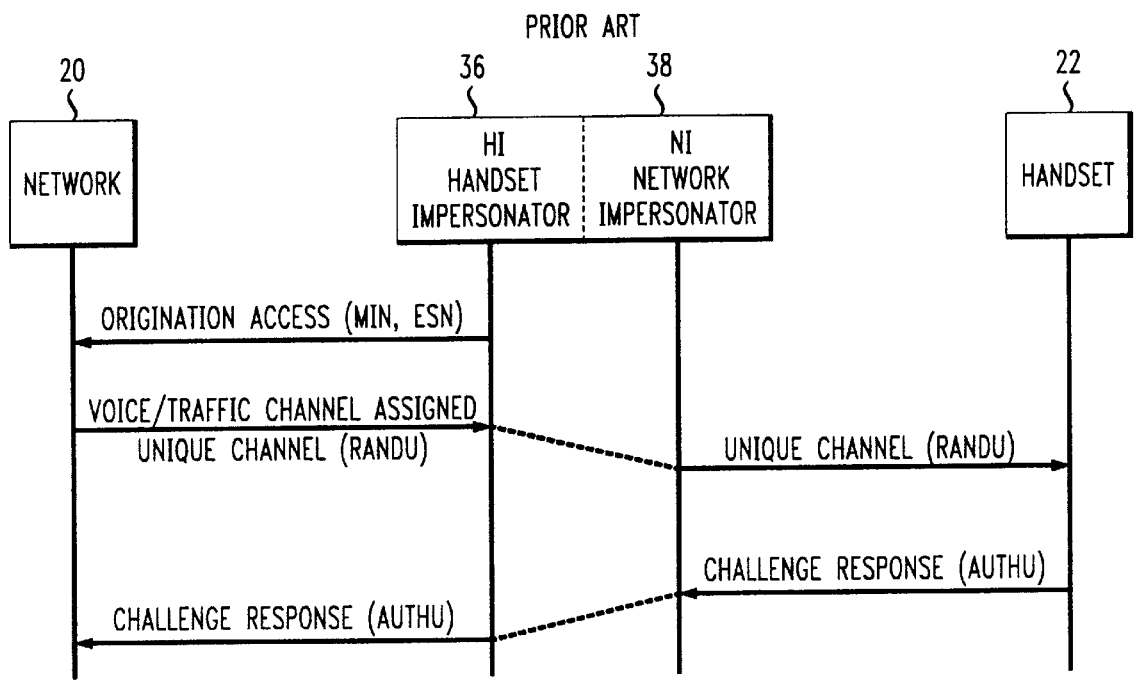
FIG. 7 illustrates how an impersonator or cloner might respond to a unique challenge using a replay attack.
Figure 8:
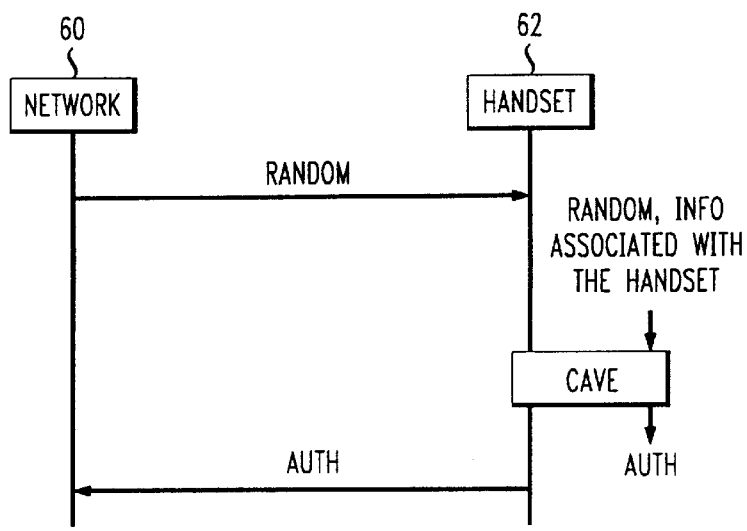
FIG. 8 illustrates an authentication protocol used in accordance with the present invention.

FIG. 8 illustrates an authentication protocol used in accordance with the present invention. A wireless communication network or an authentication center 60 issues a challenge to a handset 62 attempting to perform call origination. Specifically, the network 60 generates and transmits a random number (RANDOM), which is to be used by the handset 62 to determine an authentication code (AUTH) in response to the challenge. The challenge may be a global challenge or a unique challenge. In the case of the latter, the network 60 will also transmit a mobile identification number (MIN) specifying the handset to which the challenge is being issued. Note that the random number (RANDOM) is a character string comprising numeric and/or alphanumeric characters.

Upon receiving the challenge, the handset 62 determines the AUTH using the RANDOM and a first set of information associated with the handset 62 as parameters for its cryptographic function, such as the CAVE algorithm. The handset 62 transmits the AUTH and a second set of information associated with the handset 62 to the network 60 as its response to the network's challenge. The second set of information may include all or a portion of the first set, and is used by the network 60 for determining its own AUTH for purposes of authenticating the handset 62. The first and second sets of information should at least include a telephone number to which the handset 62 is dialing (also referred to herein as "dialed telephone number").

Figure 9:
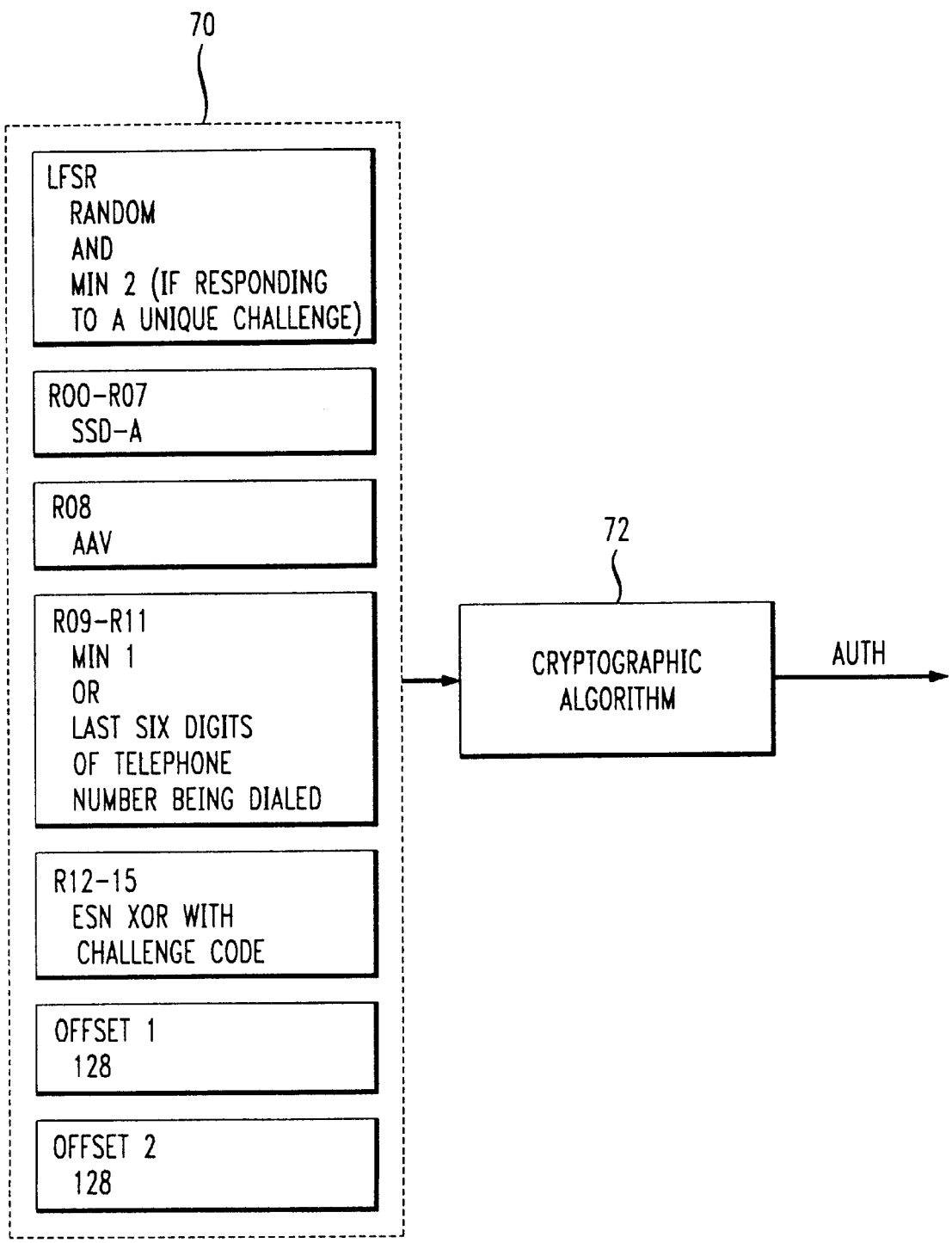
FIG. 9 illustrates a manner for determining the AUTH at a handset and a network in response to a challenge.

The present invention strengthens the authentication protocol by using the most significant digits of the dialed telephone number as a parameter for determining the AUTH, as will be described herein. FIG. 9 illustrates a manner for determining the AUTH at the handset 62 (and the network 60) in response to a challenge. The parameters used for determining the AUTH (i.e., first set of information) are stored in a plurality of registers 70 where they are subsequently provided as input to a cryptographic function executing on a microprocessor 72.

In current implementations of the IS-41 standard, the plurality of registers 70 include a 32 bit linear feedback shift register (LFSR), sixteen 1 byte registers (R00 through R15), and two 1 byte offset registers (offset 1 and offset 2). When the handset 62 is attempting to perform call origination, the following parameters are loaded into the registers 70 for determining the AUTH: a secret shared data A (SSD-A) in registers R00–R07; an authentication algorithm version (AAV) in register R08; a MIN1 in registers R09–R11 if the handset is responding to a unique challenge on call origination; the six least significant digits of the dialed telephone number from registers R09–R11 if the handset is responding to a global challenge on call origination; electronic serial number (ESN) in registers R12–R15; the RANDOM in the LFSR if the handset is responding to a global challenge; the RANDOM and MIN2 in the LFSR if the handset is responding to a unique challenge; and offset values of one hundred twenty eight (128) in offset registers 1 and 2.

The SSD-A is a private key known only to the network 60 and the handset 62; the AAV specifies the version of the CAVE algorithm being used to generate the authentication code; the MIN1 and MIN2 are the NXX-XXXX and NPA portions, respectively, of the MIN; and the ESN identifies the make and model of the handset 62. Before loading the parameters into the registers 70, the RAND is typically XOR with the thirty-two most significant bits of the SSD-A, and then XOR with the thirty-two least significant bits of the SSD-A.

The present invention may be incorporated into the current implementations of the IS-41 standard by substituting the most significant digits of the dialed telephone number for one or more of the parameters of the current implementations of the IS-41 standard (hereinafter referred to as "IS-41 parameters"), or by combining the most significant digits of the dialed telephone number with one or more IS-41 parameters, thus making the dialed telephone number's most significant digits a parameter for determining the AUTH. The present invention will now be discussed herein with reference to an embodiment of the present invention that is incorporated into the current implementations of the IS-41 standard. This should not be construed, however, to limit the present invention in any manner.

One objective of the present invention is to substitute or combine the IS-41 parameters with as many of the dialed telephone number's most significant digits as possible. The greater the number of most significant digits substituted for or combined with the IS-41 parameters, the more difficult it is for an impersonator to use a replay attack to perform call origination. Ideally, the entire dialed telephone number is substituted for or combined with the IS-41 parameters to determine an AUTH that would be very difficult for an impersonator to successfully use in a replay attack. For example, suppose a legitimate handset receives a challenge and determines an AUTH using the RANDOM (in the challenge) and a first set of information (comprising the IS-41 parameters and the dialed telephone number). The legitimate handset subsequently responds to the challenge by transmitting its AUTH and a second set of information (comprising the dialed telephone number, and its MIN and ESN). Further suppose the dialed telephone number is "12125551212". If only the four most significant digits of the telephone number is used to determine the AUTH (by the legitimate handset and the network), then an impersonator intercepting the response (of the legitimate handset) may use the AUTH contained within the intercepted response (and determined by the legitimate handset) to dial any telephone number within the same area code as the telephone number dialed by the legitimate handset (i.e., 212 area code). If the seven most significant digits were used to determine the AUTH, then the impersonator can only use the same AUTH to dial another telephone number within the same area code and exchange (i.e., 212 area code and 555 exchange), thus making it more difficult for the impersonator to use the AUTH to perform call origination. If the complete telephone number was used to determine the AUTH, then the impersonator can only use the same AUTH to perform call origination to the same telephone number dialed by the legitimate handset.

For illustration purposes, the present invention will be described herein using an example that combines the entire dialed telephone number with the AAV, MIN1, and ESN parameters to determine an AUTH in response to a unique challenge. Note that the entire dialed telephone number should be no more than 15 digits in length if the telephone number conforms to the well-known E.163 numbering plan, which specifies that the longest telephone should be no longer than 15 digits in length (which includes 3 digits for accessing international dialing).

Figure 10:
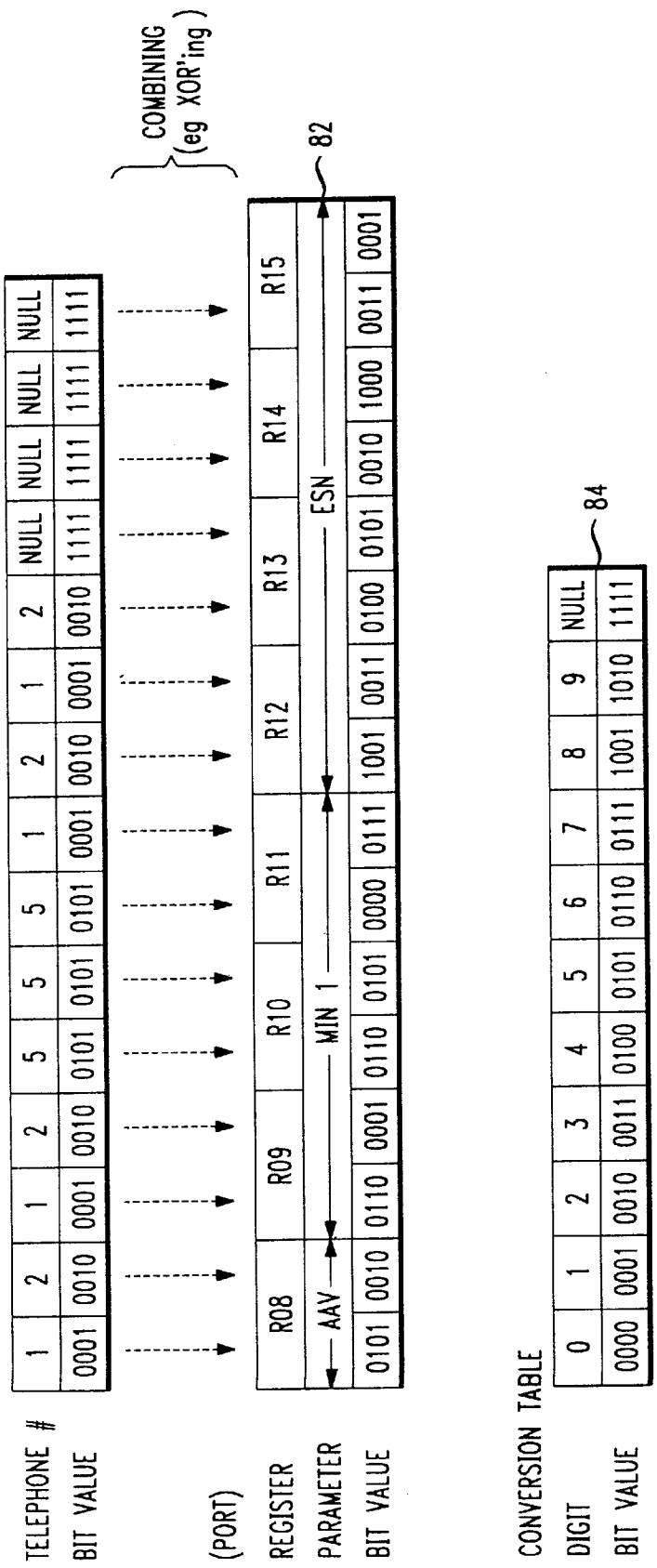
FIG. 10 illustrates a manner for combining a dialed telephone number with other parameters for determining an authentication code.

In this example, as shown in FIG. 10, each digit of the dialed telephone number is converted to a four bit value (using table 84) and subsequently combined with the AAV, MIN1 and ESN parameters using an XOR binary operation. See tables 80 and 82. Specifically, the four bit value representing the first most significant digit of the dialed telephone number is XOR'ed with the high four bits in the register R08 (i.e., part of the AAV). The result of the XOR binary operation is stored in the high four bits of the register R08. The four bit value representing the second most significant digit of the dialed telephone number is XOR'ed with the low four bits in the register R08. The result of this XOR binary operation is stored in the low four bits of the register R08.

This process is repeated until the four bits representing the fifteenth most significant digit of the dialed telephone number has been XOR'ed with the high four bits in the register R15 (i.e., part of the ESN parameter) using the binary operation, and the result of the XOR binary operation is stored in the high four bits of the register R15. If the length of the dialed telephone is less than 15 digits, a null value may be XOR'ed with the remaining non-XOR'ed bits in the registers R08–R15 (up to the high four bits of the register R15).

The results of the binary operations stored in the registers R08–R15 are provided as input (along with the parameters stored in other parts of the registers 70) to the cryptographic algorithm to determine an AUTH. The output AUTH is transmitted from the handset 62 along with a second set of information (which includes the dialed telephone number) to the network 60 for purposes of authenticating the handset 62. The network 60 will determine its own AUTH using the RAND and the second set of information. An impersonator intercepting the AUTH from the handset 62 transmission would not be able to use the AUTH (in the transmission) to place a call to a telephone number other than the telephone number dialed by the handset 62. Thus, the authentication protocol is strengthened.

Although the present invention has been described in considerable detail with reference to certain embodiments of wireless communications networks using authentication protocols based on the IS-41 standard, other versions are possible. For example: the entire dialed telephone number may be combined with different IS-41 parameters; a predetermined number of most significant digits of the dialed telephone number is combined with the IS-41 parameters; and the dialed telephone number may be encoded prior to combining it with the IS-41 parameters (e.g., encode every 3 digits into 10 bits). It should readily be apparent to one of ordinary skill in the art that the present invention is equally applicable to other types of authentication protocols, different cryptographic functions or encryption algorithms, and different numbering plans (e.g., E.164 ISDN, which specifies that the longest telephone number should be no longer than 18 digits in length including international access dialing). Therefore, the spirit and scope of the present invention should not be limited to the description of the embodiments contained herein.

I claim:

1. A method for authenticating a mobile-transmitter at a network comprising the steps of:

transmitting a challenge to the mobile-transmitter;

receiving a response to the challenge from the mobile-transmitter, the response having a first authentication code, information associated with the mobile-transmitter and a telephone number to be dialed;

determining a second authentication code using the information associated with the mobile-transmitter and a set of most significant digits of the telephone number to be dialed, the set of most significant digits being less than all of the digits in the telephone number to be dialed; and authenticating the mobile-transmitter using the first authentication code and the second authentication code.

2. The method of claim 1, wherein the user is authenticated if the first authentication code is identical to the second authentication code.

3. The method of claim 1, wherein the user is not authenticated if the first authentication code is not identical to the second authentication code.

4. The method of claim 1, wherein the challenge includes a character string and the second authentication code is determined using the character string.

5. The method of claim 1, wherein the second authentication code is determined using other parameters.

6. The method of claim 5, wherein the set of most significant digits is combined with some of the other parameters.

7. The method of claim 5, wherein the set of most significant digits is substituted for some of the other parameters.

8. A method for responding at a mobile-transmitter to a challenge issued by a network comprising the steps of:

receiving at the mobile-transmitter a challenge with a character string;

determining an authentication code using a set of most significant digits of a telephone number to be dialed and the character string, the set of most significant digits being less than all of the digits in the telephone number to be dialed; and transmitting a response to the challenge from the mobile-transmitter, the response having the authentication code and the telephone number to be dialed.

9. The method of claim 8, wherein the response includes information associated with the mobile-transmitter.

10. The method of claim 8, wherein the authentication code is determined using other parameters.

11. The method of claim 10, wherein the set of most significant digits is combined with some of the other parameters.

12. The method of claim 10, wherein the set of most significant digits is substituted for some of the other parameters.

* * * * *